Oct. 27, 1936.　　　M. KAMPER　　　2,058,802
POWER TRANSMISSION SYSTEM
Filed Aug. 15, 1933　　　5 Sheets-Sheet 1

Oct. 27, 1936.  M. KAMPER  2,058,802
POWER TRANSMISSION SYSTEM
Filed Aug. 15, 1933  5 Sheets-Sheet 2

Oct. 27, 1936.  M. KAMPER  2,058,802
POWER TRANSMISSION SYSTEM
Filed Aug. 15, 1933  5 Sheets—Sheet 5

Patented Oct. 27, 1936

2,058,802

UNITED STATES PATENT OFFICE 2,058,802

POWER TRANSMISSION SYSTEM

Mathis Kamper, Hallston, near Leongatha, Australia

Application August 15, 1933, Serial No. 685,170
In Great Britain August 17, 1932

20 Claims. (Cl. 74—337)

The present invention relates to change-speed gearing of the type in which the ratio of the gearing is adapted to be varied automatically in accordance with variation in torque load on the gearing.

The invention is suitable for any form of power transmission system where variation in speed is required in accordance with the load imposed; but it is especially suitable for use in the transmission system of vehicles driven by internal-combustion engines.

An object of the invention is the provision of an improved change-speed gearing of the type set forth, which is reliable in operation and relatively cheap to manufacture.

A further object is to provide an improved change-speed gearing particularly suitable for use in road motor vehicles.

A still further object is to provide an improved change-speed gearing which, while it is capable of being controlled automatically in response to variations in the torque load thereon, is nevertheless adapted for operation in response to influences other than the torque, for instance, at will of an operator for changing gear under circumstances where the torque control is unsuitable.

A further object of the invention is to provide a displaceable torque responsive device, the operation of which is directly controlled by the torque of the driven shaft, and which undergoes step-by-step displacement as lower speed gear ratios are successively engaged under load, and which serves for selectively actuating a series of gear selecting friction clutches connected in parallel between the driving and driven shafts.

In the form at present preferred, gearing according to the invention comprises a spur-wheel counter-shaft gear box of the constant-mesh type provided with a plurality of gear-selecting friction clutches, wherein the counter-shaft is adapted to undergo a limited circumferential displacement about the axis of the aligned input and output shafts, its position of displacement being automatically determined by the torque reaction, and wherein means are provided whereby the displacement of said counter-shaft serves to actuate said gear-selecting clutches in predetermined sequence.

To secure an automatic control characteristic that will render a change-speed gear suitable for use with an internal-combustion-engined vehicle, it is necessary to employ control mechanism responsive to the torque existing in the driven shaft of the gearing, in such manner that the same or substantially the same maximum driving torque can be applied to the gearing irrespective of the ratio engaged. As the torque in the output shaft may attain a considerably higher value than the torque of the driving engine, the problem of providing a torque-responsive device capable of transmitting the whole output torque, and which would nevertheless be reliable and sensitive enough for the object in view, would present considerable difficulty. The present invention provides a way of avoiding this difficulty, since it enables a gearing to be constructed in which the control mechanism is actuated by a device responsive to variation in the torque reaction in the gearing, that is, the difference between the input and output torques of the gearing, and not to variation in the entire output torque. Thus the torque reaction acting on the torque-responsive device is substantially less than the output torque, being in fact zero when a direct drive is established; nevertheless the reaction varies in the same sense as the output torque, and a gear control device responsive to the reaction can therefore produce a control characteristic which, for the present purpose, is equivalent to the control characteristic that would be given by a device responsive to the output torque alone. The reaction-responsive device, in its preferred form, includes a rocking frame or cage in which the counter-shaft is mounted, and which is journalled in the gear box so as to be capable of rocking about the axis of the aligned input and output shafts, and the rocking cage is arranged to actuate, through a cam, a common control member for operating a nested group of gear-selecting clutches, whereby a compact and relatively simple design is obtained.

The invention will be further described with reference to the constructional examples shown in the accompanying drawings, in which.

Figure 7:
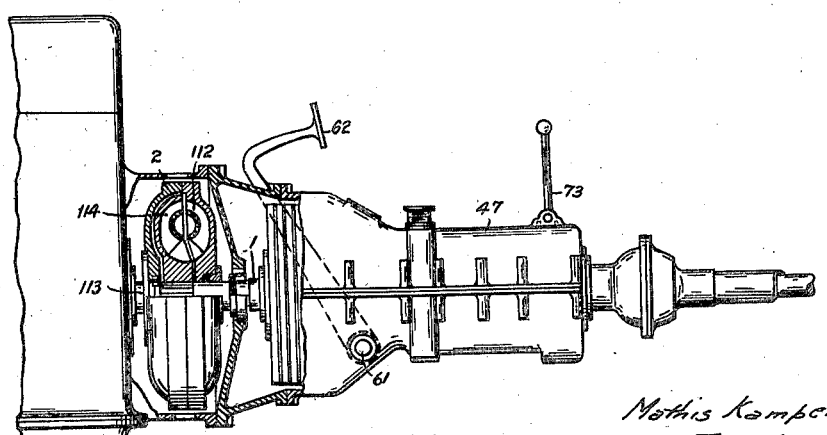
Fig. 7 is a diagrammatic elevation of an automobile transmission system embodying the gearing shown in detail in Figs. 1 to 6.

Figs. 1 to 4 show a three-speed and reverse gearing for an automobile. Attached to a driving shaft 1, which may be an engine crank-shaft or, as shown in Fig. 7 the driven shaft of an auxiliary clutch device 2, is a built-up clutch driving body 3 which includes three disk clutches disposed one behind another and having driving plates constrained to rotate with the clutch body. Secured to the rear (that is, the side remote from the driving shaft) of the clutch body 3 is a plate 4 which forms one of the driving plates of the second-gear clutch. The other driving plate of this clutch is formed by an axially slidable annular presser plate 5 which is carried by four or more stepped pins 6 uniformly spaced round the clutch body and slidably fitted in bushes 7 and 8 secured to the plate 4 and the front of the body respectively.

The bottom-gear clutch is disposed immediately in front of the second-gear clutch, and its two driving plates are formed by an annular disk 9 secured to the body 3 and a presser plate 10 carried on the pins 6. The top-gear clutch, which is in front of and arranged similarly to the bottom-gear clutch, has a driving disk 11 and a presser plate 12. The three presser plates 5, 10 and 12 are urged towards their respective driving plates 4, 9 and 11 by series of springs 13, 14 and 15 which react against suitable portions of the clutch driving element and which are so distributed as to exert a substantially uniform pressure on the respective friction surfaces.

The three driven plates are of the cork-insert type which operate satisfactorily when flooded with oil. The top-gear driven plate 16 is splined to the forward end of a main shaft 17, the nose of which is supported by a spigot bearing 18. The bottom-gear driven plate 19 is journalled by needle rollers 20 on the boss of the plate 16 and is splined to the forward end of a hollow shaft 21 co-axial with the main shaft 17. On the rear of the shaft 21 is formed a bottom-gear driving pinion 22. The second-gear driven plate 23, which is supported with respect to the driving plate 4 and the driven plate 19 by needle rollers 24 and 25 respectively, is splined to the forward end of another hollow shaft 26 co-axial with the shaft 17. On the rear of the shaft 26 is formed a second-gear driving pinion 27. Near the rear of the main shaft 17 is journalled, by means of a pair of roller bearings 28 and 29, a main driven gear wheel 30. Disposed between the roller bearings 28 and 29 is a free-wheel device 31 of the wedging roller type, and which serves to transmit torque from the gear wheel 30 to the main shaft 17 in the normal direction of rotation thereof, but allows the main shaft to over-run the gear wheel in the same direction.

The stepped pins 6, which serve to actuate the clutches, are secured to a spider 32 which can be moved towards the clutches by a non-rotatable sleeve 34 acting through a ball thrust bearing 33. The diameter of the pins 6 is reduced in three steps, denoted by $a$, $b$ and $c$, from rear to front, the part of largest diameter passing through the bush 7 in the driving plate 4, the part between steps $a$ and $b$ passing through the plates 5 and 9, the part between steps $b$ and $c$ passing through the plates 10 and 11, and the part of smallest diameter passing through the plate 12 and the bush 8 in the body 3. The longitudinal disposition of the steps is such that, as the spider and pins are moved from their rearmost to their foremost positions, the clutches are consecutively disengaged in the order top, second, bottom.

A live counter-shaft 40 is journalled by bearings 41 and 42 in a cage or frame member adapted to rock through a limited angle about the axis of the main shaft 17. The cage includes a shell 43 to the rear of which is bolted a cover 44 provided with a boss 45 journalled in a bearing 46 forming part of the upper portion of the two-part gear casing 47. A bearing 48 fitted within the boss 45 supports the rear end of the main shaft 17. To the front portion 49 of the cage shell 43 is fixed a hollow boss 50 surrounding the co-axial gear shafts and journalled in a bush 51 fixed in the casing 47. A bearing 52 housed in the member 49 supports the second-gear pinion 27, while a bearing 53 housed in the pinion 27 supports the bottom-gear pinion 22.

The front end of the boss 50 terminates in a series of axial cams 54 which co-operate with cams 55 formed on the rear of the sleeve 34. A pair of levers 56 journalled on a fixed rod 57 are provided with holes 56' (Fig. 2) in which are fitted a pair of pins 58 projecting from the sleeve 34. The holes 56' are slightly oval in cross-section, the longer axis of the oval lying longitudinally of the levers 56 to allow for slight relative endwise movement of the levers as they move about the rod 57 as an axis. These levers thus serve to prevent the sleeve from rotating while permitting it to slide axially of the gear shafts. The cams are so shaped that rotation of the rocking cage in a clockwise direction (as viewed in Figs. 3 and 4) imparts a forward displacement to the sleeve 34 and the spider 32. The lower ends of the levers 56 are connected together by a pin 59 behind which is engaged a lever 60 fixed to a control shaft 61 which is journalled in the casing 47 and to which is keyed a control member in the form of a pedal 62, this pedal serving as the driver's clutch-control member.

Fixed to the counter-shaft 40 are a second-gear driven wheel 63 in constant mesh with the pinion 27, and a main gear pinion 64 meshing with the wheel 30. A bottom-gear driven wheel 65, meshing with the pinion 22, is journalled by bearings 66 and 67 on the counter-shaft and is adapted to be drivably connected thereto by a roller free-wheel device 68 arranged to transmit torque from the wheel to the shaft in their normal direction of rotation, but to allow the shaft to over-run the wheel in the same direction.

The output shaft 69 of the gearing is co-axial with the main shaft 17, being supported by a spigot bearing 70 and a rear bearing 71. The forward end of the output shaft is splined, and carries a splined gear wheel 72 which can be slid axially by a control lever 73 (Figs. 3 and 7) acting through a selector yoke 74 of ordinary design.

Figure 1:
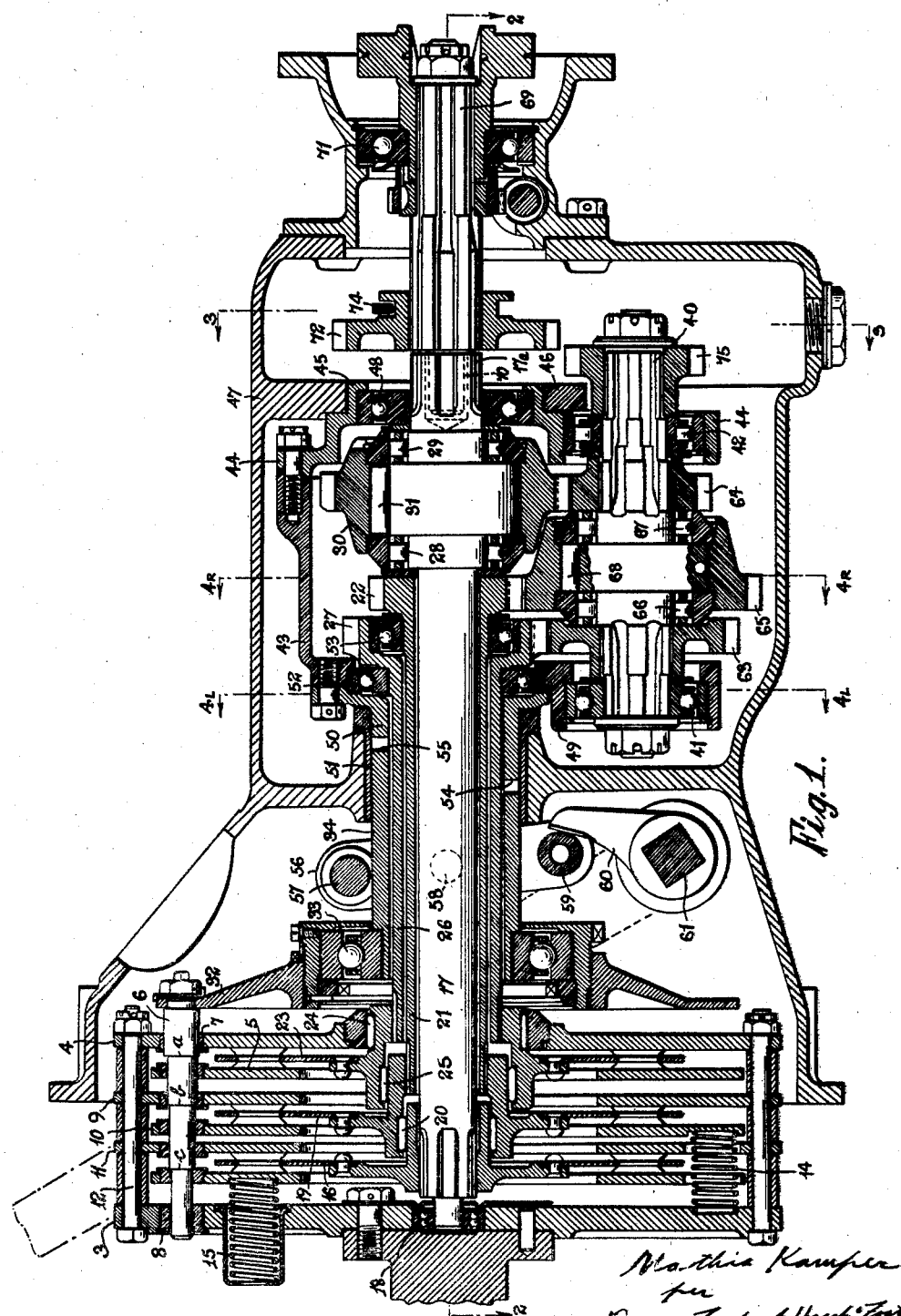
Fig. 1 is a sectional side elevation of one form of the improved gearing, taken on the line 1—1 in Fig. 4.
Figure 2:
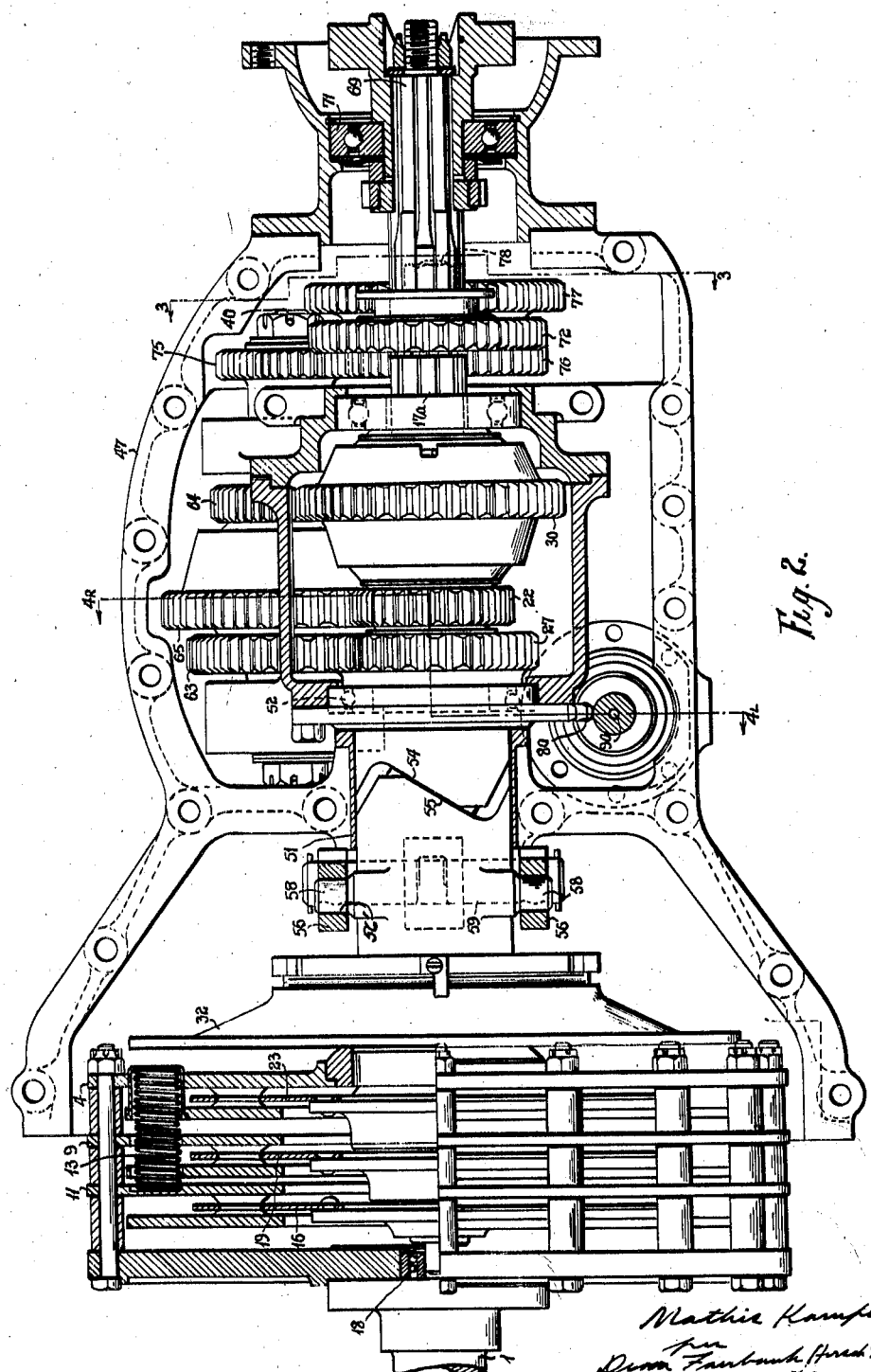
Fig. 2 is a plan, partly in section taken on the line 2—2 in Fig. 1.
Figure 3:
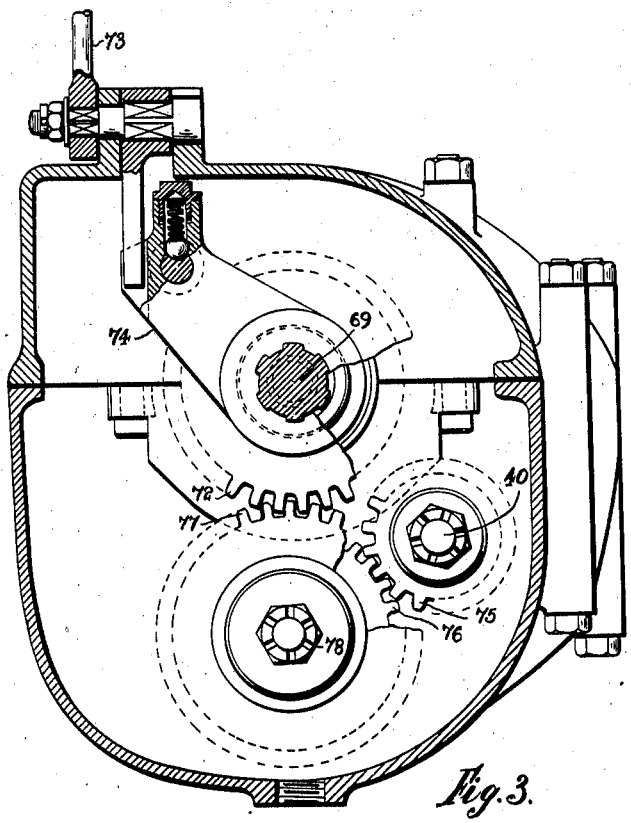
Fig. 3 is a sectional end elevation taken on the line 3—3 in Figs. 1 and 2.

When the wheel 72 is in its foremost position, it engages with a correspondingly splined portion 17a of the main shaft 17 so as to couple the main and output shafts together. As shown in Figs. 1 and 2, the wheel 72 is in a position which provides a "neutral" condition of the transmission.

Figure 4:
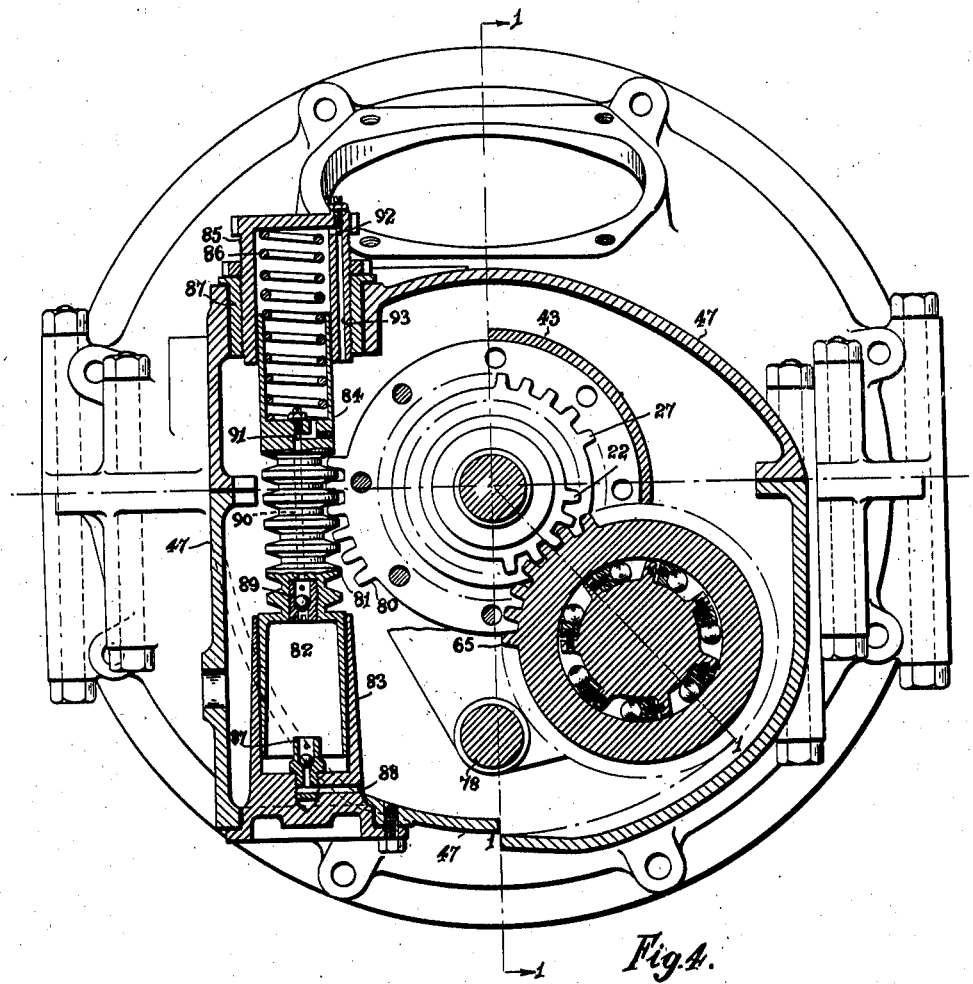
Fig. 4 is a sectional end elevation of which the right-hand half is taken on the line 4R in Fig. 2 and the left-hand half on the line 4L in Fig. 2.

The counter-shaft 40 extends behind the rear bearing 42 and to its rear end is fixed a reverse pinion 75 which is in constant mesh with an intermediate gear wheel 76 (Figs. 2 and 3) integral with a larger gear wheel 77, the gear cluster 76, 77 being journalled on a pin 78 fixed to the rocking cage (Fig. 4). When the slidable wheel 72 is moved to its rearmost position, it engages with the wheel 77 and thereby establishes reverse gear.

Means are provided for damping the movement of the counter-shaft cage so as to prevent too violent rocking under sudden variation of driving torque and to prevent undesired displacement of the counter-shaft as a result of surges in the torque due for example to irregularities in the surface of the road on which the vehicle is running. In the example shown the damping mechanism is combined with an auxiliary control spring that is capable of adjustment, to compensate for variation in mechanical condition or adjustment of the driving engine such as valve adjustment, carburetor setting or the like which affect the power output. On the flange of the boss 50 which is fixed to the front of the rocking cage is formed a toothed sector 80 (Fig. 4) which engages with a rack 81. To the lower end of the rack is fixed a piston 82 fitted in a cylinder 83 fixed to the gear casing 47. To the upper end of the rack is fixed a cupped piston 84 fitted in a cylinder 85, a spring 86 being compressed between the cylinder head and the piston. The cylinder is screwed into an adaptor 187 fixed to the casing 47 and is thus capable of being raised and lowered to vary the initial compression in the spring 86. A check valve 87 admits lubricating oil from the gear box by a port 88 to the under side of the piston 82 as the rack rises, and a check valve 89 exhausts oil, as the rack falls, by a duct 90 to an adjustable throttle 91 whence the oil is discharged to the upper side of the piston 84, the valve 91 controlling the fall of the rack. As the rack rises, oil above the piston 84 is exhausted through an adjustable throttle 92 which controls the rise of the rack, the oil being returned to the gear box by a duct 93. It will thus be apparent that the damping mechanism controls the rocking of the counter-shaft cage in both directions, and is moreover capable of priming itself when necessary.

Where the clutch body 3 is directly connected to the engine crank-shaft, no auxiliary clutch being interposed, the transmission may be operated as follows. Assume that the gear lever 73 is in neutral and that the driving engine is running. In order to start the vehicle from rest, the pedal 62 is fully depressed so as to disengage the three friction clutches. The gearing now comes to rest and the gear lever 73 is moved so as to slide the gear wheel 72 into its forward position, thereby coupling the main and output shafts together. The driver may now cause the vehicle to accelerate gently by partly opening the engine throttle and permitting the pedal 62 to rise slowly under the influence of the clutch springs. As a result, first the bottom-gear clutch engages and the drive is transmitted through the bottom-gear train 22, 65, the free wheel 68, the counter-shaft 40, the main gear train 64, 30, the free wheel 31, the main shaft 17, the slidable gear wheel 72 (acting as a coupling) and the output shaft 69. As the pedal rises further, the second-gear clutch engages, and the drive is transmitted through the second-gear train 27, 63, the counter-shaft 40, and thereafter as described for bottom gear, the free wheel 68 now over-running. As the pedal approaches its highest position, the top-gear clutch engages, and the drive is transmitted directly through the main shaft 17 to the output shaft 69, the free wheels 68 and 31 both over-running.

Alternatively, the driver may obtain a rapid acceleration from a standstill by allowing the pedal 62 to rise until the bottom-gear clutch is engaged and thereupon opening the engine throttle far enough for the engine to produce a high torque. Now the torque reaction acting on the counter-shaft cage urges the cage in a clockwise direction (as viewed in Fig. 4), and the equilibrium position of the cage is that in which the axial thrust generated, as a result of torque reaction, by the cams 54, 55 in the sleeve 34 balances the thrust due to the clutch springs. When bottom gear is engaged and the engine is delivering its maximum torque or a relatively high torque, the reaction thrust is sufficient to keep the top- and second-gear clutch springs 15 and 13 compressed and thus these clutches are automatically maintained in a disengaged condition so that the driver need no longer control the pedal 62. As the engine speed increases to a high value, its torque falls in characteristic manner, and the angle of the cams 54, 55 and the strength of the clutch springs and of the adjusting spring 86 are so selected that this fall of torque causes the counter-shaft cage to rock anti-clockwise far enough for the second-gear clutch to be partly engaged. The drive is thereupon partly transferred to the second-gear train 27, 63, the second-gear clutch slipping momentarily. This partial transfer of the drive reduces the torque reaction acting on the cage which consequently is rocked still further anti-clockwise by the action of the clutch springs and the spring 86 so that the second-gear clutch becomes fully engaged and the drive is automatically transferred to second gear. As the second-gear clutch takes up the entire drive, the engine speed is forcibly reduced to a value corresponding to second gear, and the engine torque thereupon increases to a value sufficient to stabilize the counter-shaft cage in its second-gear position. As the vehicle accelerates further, the change into top gear is effected automatically as soon as the engine torque falls sufficiently to permit the top-gear clutch to engage, the operation being similar to that described with reference to the change from bottom to second gear.

Should the driver, after the vehicle has attained a certain speed, desire thereafter to accelerate more gently, it is merely necessary for him to close the engine throttle somewhat, and the consequent reduction in torque will automatically effect a change to a higher gear.

Changes to a lower gear may be made by keeping the throttle open while depressing the pedal 62 far enough to disengage the clutch of the gear on which the vehicle is running, whereupon the engine immediately accelerates and the drive is taken up upon synchronism occurring between the driving and driven elements of the free wheel 31 or 68 according to whether second or bottom gear is being established.

Reversing is effected by fully depressing the pedal 62, moving the slidable pinion 72 by means of the lever 73, into engagement with the reverse idler wheel 77, and allowing the pedal to rise far enough to engage the bottom- or the second-gear clutch as desired.

Figure 5:
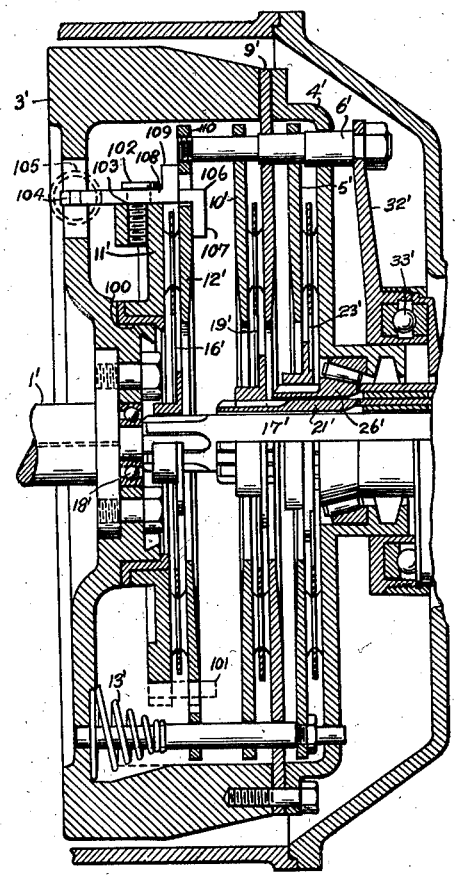
Fig. 5 is a sectional side elevation of an alternative arrangement of the clutches.
Figure 6:
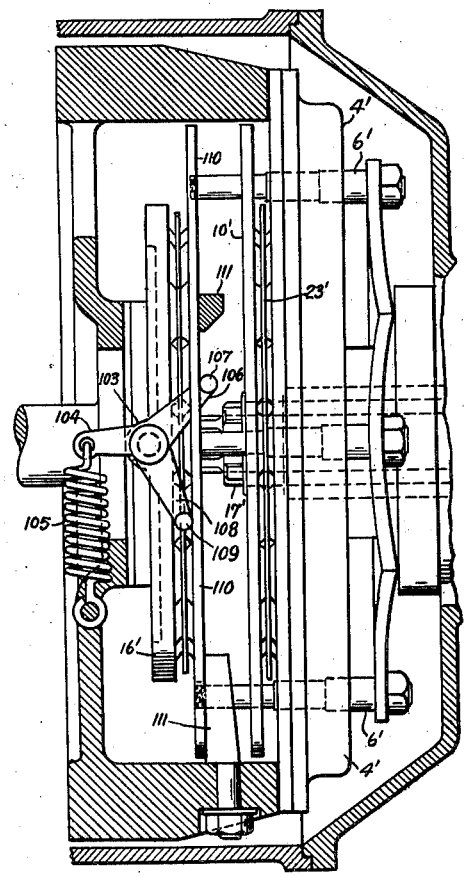
Fig. 6 is a part sectional plan of the arrangement shown in Fig. 5.

When the improved gear is used with an engine of which the torque-speed characteristic curve has a maximum value at relatively low speed and falls continuously with increasing speed, the top-gear clutch may be modified so that changes to any lower speed can take place automatically. Such a modified arrangement is illustrated in the clutch construction shown in Figs. 5 and 6, in which parts corresponding to those of the construction shown in Figs. 1 to 4 are denoted by the same numerals distinguished by dash suffixes.

The driven plate 16' of the top-gear clutch is disposed between a driving plate 11' journalled on a boss 100 formed on the body 3' and a presser plate 12' which floats on pins 101 fixed to the plate 11'. Uniformly spaced around the periphery of the plate 11', and pivotally mounted thereon by radial pins 102 are three three-armed levers 103. One arm 104 of each lever projects forward and is connected to the clutch body by a helical spring 105 arranged to extend under the influence of driving torque transmitted from the body to the driving plates. A second arm 106 passes over the edge of the presser plate 12' and terminates in an inwardly projecting pin 107 adapted to engage behind the presser plate and urge it forward into engagement with the driven plate 16' when the lever is loaded by driving torque. A third arm 108, set at about 180° to each of the others, terminates in an outwardly projecting pin 109 adapted to be pushed forward by a ring 110 carried by the stepped pins 6' so as to disengage the clutch. A finger 111 secured to the clutch body is disposed in the path of the pin 107 at such a point that, when the spring 105 is extended a predetermined distance, that is, when the torque transmitted by the clutch attains a predetermined maximum, the finger 111 will trip the lever 103 and thus allow the clutch to slip.

The slope of the cams 54 and 55 and the stiffness and initial compression of the various clutch control springs may be so selected that, when the vehicle encounters a rising gradient and as the engine speed, in falling, approaches the point at which the engine develops its maximum torque, the clutch through which the drive is passing automatically begins to slip, and thereby causes the drive to revert automatically to the next lower gear. Furthermore, if, when the vehicle is running at a suitable relatively low speed with top gear engaged and with the throttle only partly open, the throttle is opened fully, the increased torque will cause the top-gear clutch to slip and the gear to be in consequence changed automatically to second speed, whereupon the vehicle will accelerate rapidly, top gear being eventually re-engaged automatically as previously described.

Where the driving clutch element of the gear is directly connected to the engine crank-shaft, at low speeds it is necessary for the driver to operate the clutch control pedal in order to avoid risk of stalling the engine. In order to permit the vehicle to be started and stopped or driven at very low speed without risk of stalling the engine, and without the necessity for the driver to operate the clutch control pedal, there may be provided means which automatically disconnect the transmission between the driving engine and the driven shaft of the system as a result of the speed of the driving engine falling to a particular value. Such means may be provided by a hydraulic coupling of the kinetic type, denoted by 2 in Fig. 7, having an impeller element 112 rigidly coupled to the engine crank-shaft 113 and a runner element 114 arranged to drive the input shaft 1 of the change speed gearing. In operating this arrangement, the engine may be allowed to idle with top gear engaged and with the vehicle stationary, the slip in the hydraulic coupling being 100 per cent. Provided the vehicle is not standing on too steep a rising gradient, it may be set in motion by merely accelerating the engine; and when the vehicle attains such a speed that the engine can develop its maximum torque, the control of the gear ratio becomes automatic. If it is required to start the vehicle on such a gradient that the tractive effort required to accelerate it exceeds that which can be attained when the engine is revolving as fast as is possible with the runner of the hydraulic coupling stalled, it is necessary for the driver to depress the control pedal, whereupon the vehicle will be able to accelerate on a lower gear.

In place of the cams 54, 55 any other suitable means, such as a spiral gear, may be employed for actuating the clutches in response to displacement of the counter-shaft.

I claim:
1. An automatically variable change-speed gearing comprising a gear casing, a driving shaft, a plurality of co-axial gear shafts, a cage member journalled in said casing so as to be capable of rocking about the axis of said gear shafts, a counter-shaft carried by said cage member, a bearing housed in said cage member and serving to support said gear shafts, a plurality of gear trains connecting said counter-shaft to said gear shafts respectively, a driven shaft coaxial with said gear shafts, a gear train connecting said counter-shaft to said driven shaft, and means for selectively engaging said gear shafts with said driving shaft in response to rocking of said cage due to change in torque reaction imposed thereon.

2. An automatically variable change-speed gearing comprising a driving shaft, a main shaft aligned with said driving shaft, a friction clutch for establishing a direct drive between said shafts, a counter-shaft so mounted as to be capable of circumferential displacement about the axis of said driving shaft, a free wheel clutch, gear trains serving to connect said driving shaft to said main shaft through said counter-shaft and said free wheel clutch, and means for automatically actuating said friction clutch in response to displacement of said counter-shaft resulting from variation in torque reaction in said gearing.

3. An automatically variable change-speed gearing comprising a driving shaft, a driven shaft, a plurality of gear-selecting friction clutches having driving elements connected in parallel to said driving shaft and driven elements drivably connected in different ratios respectively with said driven shaft, a displaceable reaction member which is capable of being loaded by the difference between the torques in said driving and driven shafts, a spring operatively associated with and serving to control the displacement of said reaction member, which therefore undergoes step-by-step displacement as lower speed gear ratios are successively engaged under load, and means operatively connected with said reaction member for selectively actuating said clutches.

4. An automatically variable change speed gearing comprising a driving shaft, a driven member co-axial with said shaft, a counter-shaft drivably connected with said driving shaft and driven member by gear trains one of which includes a gear selecting clutch, means operable for disengaging said clutch, said counter-shaft being so mounted as to be capable of circumferential displacement about the axis of said driving shaft, spring means for resisting displacement of said countershaft, and connecting means between said counter-shaft and said clutch-disengaging means whereby displacement of said counter-shaft serves to actuate said clutch.

5. An automatically variable change speed gearing comprising a gear selecting clutch, an output shaft, a counter-shaft, a gear train serving to connect said counter-shaft to said output shaft, said counter-shaft being displaceable circumferentially about the axis of said output shaft, means whereby displacement of said counter-shaft as a result of variation of load in said gear train serves to actuate said gear selecting clutch, and a damping device of the fluid friction type adapted to control both engagement and disengagement of said clutch.

6. An automatically variable change speed gearing comprising an input shaft, a counter-shaft so mounted as to be capable of circumferential displacement about the axis of said input shaft, a spring-loaded friction clutch which on engagement serves to establish a direct drive between said input and output shafts, gear trains including a free wheel for connecting said input shaft through said counter-shaft to said output shaft in a low speed ratio, and means for engaging said clutch automatically in response to displacement of said counter-shaft due to reduction of torque loading in said gear trains.

7. An automatically variable change-speed gearing comprising an input shaft, an output shaft aligned with said input shaft, a counter-shaft, gear trains serving to connect said counter-shaft to said input and output shafts, means for changing the ratio of said gearing, said counter-shaft being adapted to be displaced automatically in accordance with variation of the torque reaction in said gearing, and means whereby the displacement of said counter-shaft serves to actuate said gear-changing means.

8. An automatically variable change-speed gearing comprising an input shaft, an output shaft, a counter-shaft, gear trains serving to connect said input shaft to said counter-shaft and said counter-shaft to said output shaft, said counter-shaft being so mounted that it is capable of displacement as a result of variation in the torque reaction acting thereon, means for disconnecting the drive through one of said gear trains, and means whereby displacement of said counter-shaft serves to actuate said drive disconnecting means.

9. An automatically variable change-speed gearing comprising coaxial input and output shafts, a counter-shaft parallel to said coaxial shafts, gear trains serving to connect said input shaft to said counter-shaft and said counter-shaft to said output shaft, said counter-shaft being so mounted that it is capable of displacement circumferentially about the axis of said coaxial shafts as a result of variation in the torque reaction acting thereon, a clutch for disconnecting the drive through one of said trains, and means whereby displacement of said counter-shaft serves to actuate said clutch.

10. An automatically variable change-speed gearing comprising a plurality of coaxial gear shafts, a counter-shaft connected by gear trains to said gear shafts in different ratios, a plurality of gear-selecting clutches associated with said gear shafts respectively, a main shaft coaxial with said gear shafts and connected by a gear train to said counter-shaft, a cage member in which said counter-shaft is journaled and which is capable of rocking about the axis of said gear shafts as a result of variation in torque reaction on the cage, means operable for actuating said clutches in succession, and an operative connection between said cage and said clutch actuating means.

11. An automatically variable change-speed gearing comprising a driving shaft, a plurality of coaxial gear shafts, a plurality of gear-selecting clutches having driving members connected in parallel to said driving shaft and driven members connected to said gear shafts respectively, a member slidable axially of said gear shafts for the purpose of actuating said gear selecting clutches, a counter-shaft drivably connected with said gear shafts in different ratios, an output shaft drivably connected with said counter-shaft and disposed coaxially with said gear shafts, a cage member in which said counter-shaft is journaled and which is capable of rocking about the axis of said gear shafts as a result of variation in torque reaction on the cage, and an operative connection for transforming the rocking motion of said cage into axial motion of said clutch-actuating member.

12. A power transmission system comprising a driving shaft, an output shaft, a main gear shaft adapted to transmit torque directly to said output shaft so as to establish a 1-to-1 gear ratio, means for changing the ratio of said gearing, including a gear-selecting friction clutch for connecting said main gear shaft directly to said driving shaft, means responsive to variation in the difference in the torques in said driving and output shafts, operatively connected with said gear changing means and serving to change the gear ratio automatically, and additional means for automatically disengaging said direct-drive friction clutch as a result of the torque transmitted thereby rising to a particular value.

13. In an automobile driven by an internal combustion engine, the combination of an engine driven shaft, a multi-ratio gearing having an output shaft, a counter-shaft, and gear trains which serve to connect said counter-shaft to said engine driven shaft and said output shaft, means for changing the ratio of said gearing, means responsive to torque reaction in said counter-shaft, operatively connected with said gear changing means and serving to change the gear ratio automatically, and means which serve automatically to disconnect the transmission between said engine driven shaft and said output shaft as a result of the speed of said engine driven shaft falling to a particular value.

14. An automatically variable change-speed gearing comprising a rotatable driving member, a gear shaft coaxial with said driving member, a cage member adapted to rock about the axis of said shaft, a counter-shaft carried by said cage member, gear trains which serve to transmit the drive from said driving member to said counter-shaft and from said counter-shaft to said gear shaft, clutch mechanism which in one condition establishes a direct drive between said driving member and said gear shaft and in another condition establishes an alternative ratio through said gear trains and said counter-shaft, and means responsive to rocking of said cage member under torque reaction for changing the condition of said clutch mechanism.

15. An automatically variable change-speed gearing comprising an input shaft, a gear shaft, a counter-shaft, gear trains connecting said counter-shaft to said input and gear shafts, a spring-loaded gear-selecting friction clutch in series with said gear trains, means operable for disengaging said clutch, said counter-shaft being so mounted as to be capable of displacement circumferentially about the axis of said gear shaft under the influence of increasing torque reaction borne by said counter-shaft, and an operative connection between said counter-shaft and said clutch-disengaging means, whereby said displacement of the counter-shaft serves to disengage said clutch.

16. A power-transmission system comprising a rotatable driving member, a gear shaft coaxial with said driving member, a counter-shaft, gear trains serving to connect said driving member through said counter-shaft to said gear shaft in a low speed ratio, gear selecting means operable for establishing alternatively between said driving member and said gear shaft a direct drive and said low speed ratio, said counter-shaft being capable of circumferential displacement about the axis of said gear shaft under the influence of decreasing torque reaction when said low speed ratio is engaged, a connection between said counter-shaft and said gear selecting means whereby said displacement serves to engage direct drive, an engine-driven shaft, and a hydraulic coupling of the kinetic type disposed between said engine driven shaft and said driving member.

17. An automatically variable change-speed gearing comprising aligned driving and driven shafts, a plurality of constant-mesh gear-trains selectively engageable for coupling together said shafts in alternative ratios, a plurality of friction clutches associated with said shafts and gear trains and selectively operable for establishing alternatively a direct drive and a plurality of indirect ratios between said shafts, control means for operating said clutches, a spring-loaded member capable of displacement about the axis of said shafts and on which are carried intermediate members of said constant-mesh gear trains, and an operative connection between said spring-loaded member and said control means, whereby displacement of said member in consequence of change of torque reaction imposed thereon actuates said clutch control means.

18. An automatically variable change-speed gearing comprising aligned driving and driven shafts, a constant-mesh gear-train capable of connecting said shafts, selecting means associated with said gear-train and operable for engaging and disengaging said gear-train, a spring-loaded reaction element rotatable about the axis of said shafts and on which is carried an intermediate member of said gear-train, an operative connection between said reaction element and said selecting means, and a frictional device associated with said reaction element and serving to damp oscillations thereof about said axis.

19. An automatically variable change speed gearing comprising a driving shaft, a driven shaft co-axial with said driving shaft, a plurality of gear-selecting friction clutches one of which serves to establish a direct drive between said shafts and the others of which are in series respectively with gear trains of different ratios, each of said gear trains connecting together said shafts through the clutch associated therewith, associated with each of the lower speed ratios a free wheel device, which permits a friction clutch which serves to select a higher speed ratio to transfer the drive from a lower to said higher speed ratio without interruption of the transmission of power from said driving shaft to said driven shaft, a common control member serving on continued displacement in one direction to actuate said friction clutches in succession, and a reaction member loaded by the difference between the torque in said driving and driven shafts for automatically actuating said common control member.

20. In an automobile having an internal combustion driving engine, a driving axle, change-speed gearing for connecting said engine to said axle, means operable for varying the ratio of said gearing, a torque-responsive device drivably associated with said driving axle and comprising a spring serving to resist torque loading applied to said device, and an operative connection between said torque-responsive device and said gear-changing means, which serves to vary the gear ratio automatically, the provision of an auxiliary spring, also serving to resist torque loading applied to said device, and means for adjusting the initial load applied by said auxiliary spring to said device, adjustment of which serves to vary the torque values at which gear changing takes place.

MATHIS KAMPER.